United States Patent
Liu et al.

(10) Patent No.: US 10,452,220 B2
(45) Date of Patent: Oct. 22, 2019

(54) DISPLAY SUBSTRATE, DISPLAY PANEL AND DISPLAY DEVICE

(71) Applicant: SHANGHAI TIANMA MICRO-ELECTRONICS CO., LTD., Shanghai (CN)

(72) Inventors: Liang Liu, Shanghai (CN); Xingyao Zhou, Shanghai (CN); Feng Lu, Shanghai (CN)

(73) Assignee: SHANGHAI TIANMA MICRO-ELECTRONICS CO., LTD., Shanghai (CN)

(*) Notice: Subject to any disclaimer, the term of this patent is extended or adjusted under 35 U.S.C. 154(b) by 121 days.

(21) Appl. No.: 15/788,750

(22) Filed: Oct. 19, 2017

(65) Prior Publication Data

US 2019/0004634 A1    Jan. 3, 2019

(30) Foreign Application Priority Data

Jun. 30, 2017  (CN) .......................... 2017 1 0522462

(51) Int. Cl.
 *G06F 3/045* (2006.01)
 *G01L 1/18* (2006.01)
 *G06F 3/041* (2006.01)

(52) U.S. Cl.
 CPC ........... *G06F 3/045* (2013.01); *G01L 1/18* (2013.01); *G06F 3/041* (2013.01); *G06F 2203/04105* (2013.01)

(58) Field of Classification Search
 CPC ................................... G06F 3/045; G01L 1/18
 See application file for complete search history.

(56) References Cited

U.S. PATENT DOCUMENTS

| | | | | |
|---|---|---|---|---|
| 2010/0079155 A1* | 4/2010 | Matsuoka | ............... | G01L 23/18 324/691 |
| 2010/0270516 A1* | 10/2010 | Lu | ........................... | B22F 1/025 252/519.2 |
| 2013/0285970 A1* | 10/2013 | Ahn | ........................ | G06F 3/044 345/173 |

* cited by examiner

*Primary Examiner* — Mark W Regn
(74) *Attorney, Agent, or Firm* — Kilpatrick Townsend & Stockton LLP

(57) ABSTRACT

Disclosed are a display substrate, a display panel and a display device. The display substrate comprises: a base substrate; at least one pressure sensor provided on the base substrate and comprises a first pressure-sensitive resistor and a second pressure-sensitive resistor, wherein the first pressure-sensitive resistor comprises at least two first sub-pressure sensitive resistors connected in series, and the second pressure-sensitive resistor comprises at least two second sub-pressure sensitive resistors connected in series, a first principal strain induction direction of the first sub-pressure sensitive resistor intersects a second principal strain induction direction of the second sub-pressure sensitive resistor, and a second end of the first pressure-sensitive resistor and a first end of the second pressure-sensitive resistor are electrically connected with a pressure-sensitive signal output line.

19 Claims, 13 Drawing Sheets

DISPLAY SUBSTRATE, DISPLAY PANEL AND DISPLAY DEVICE

CROSS-REFERENCE TO RELATED APPLICATIONS

This application claims priority to Chinese Patent Application No. 201710522462.3, filed on Jun. 30, 2017 and entitled "DISPLAY SUBSTRATE, DISPLAY PANEL AND DISPLAY DEVICE", the disclosure of which is incorporated herein by reference in its entirety.

TECHNICAL FIELD

The present disclosure relates to display technologies, and in particular, to a display substrate, a display panel and a display device.

BACKGROUND

With the development of display technologies, the applications of a pressure sensing function are widely used in a display device. At present, there are mainly two kinds of pressure sensors for realizing the pressure sensing function, that is, a resistive pressure sensor and a capacitive pressure sensor. The resistive pressure sensor attracts much attention in the industry due to its high sensitivity and low cost.

Currently, the resistive pressure sensor may include a Wheatstone full bridge-type pressure sensor and a Wheatstone half bridge-type pressure sensor. For both the Wheatstone full bridge-type pressure sensor and the Wheatstone half bridge-type pressure sensor, sensing locations are needed to be provided on a display panel according to the sensing ranges of the pressure sensors and provide the pressure sensors corresponding to the sensing locations in a one-to-one relationship. Therefore, one or more pressure-sensitive signal output lines need to be led out separately for each pressure sensor. In the case that a large number of pressure sensors are provided, a large number of pressure-sensitive signal output lines need to be provided, and hence the arrangement of wirings will be complex, and the process difficulty and cost will be high.

SUMMARY

The present disclosure provides a display substrate, a display panel and a display device, thereby solve the problem that the number of pressure-sensitive signal output lines is large and the the arrangement of wirings is complex.

In a first aspect, the disclosure provides a display substrate, which comprises: a base substrate, which includes a display region and a non-display region surrounding the display region; at least one pressure sensor, which is provided on the base substrate and includes a first pressure-sensitive resistor and a second pressure-sensitive resistor, the first pressure-sensitive resistor includes at least two first sub-pressure sensitive resistors connected in series, and the second pressure-sensitive resistor includes at least two second sub-pressure sensitive resistors connected in series; the first sub-pressure sensitive resistor has a first principal strain induction direction, the second sub-pressure sensitive resistor has a second principal strain induction direction, and the first principal strain induction direction is intersected with the second principal strain induction direction; the first sub-pressure sensitive resistors are provided corresponding to the second sub-pressure sensitive resistors, respectively, so as to form at least two pressure-sensitive resistor pairs each including one of the first sub-pressure sensitive resistors and one of the second sub-pressure sensitive resistors; in each of the pressure-sensitive resistor pairs, a point on the first sub-pressure sensitive resistor farthest from the second sub-pressure sensitive resistor is a first point, a point on the second sub-pressure sensitive resistor farthest from the first sub-pressure sensitive resistor is a second point, and a distance from the first point to the second point is less than or equal to 5 mm; and a pressure-sensitive signal line, which includes a first power input line, a second power input line and a pressure-sensitive signal output line, the first power input line and the second power input line are configured to input a pressure-sensitive reference signal to the pressure sensor, and the pressure-sensitive signal output line is configured to output a pressure-sensitive signal from the pressure sensor; wherein, a first end of the first pressure-sensitive resistor is electrically connected with the first power input line, a second end of the first pressure-sensitive resistor and a first end of the second pressure-sensitive resistor are electrically connected with the pressure-sensitive signal output line, and a second end of the second pressure-sensitive resistor is electrically connected with the second power input line.

In a second aspect, the disclosure further provides a display panel, which includes the display substrate of the above first aspect.

In a third aspect, embodiments of the disclosure further provides a display device, which includes the display panel of the above second aspect.

In the embodiments of the disclosure, each of the pressure sensors is provided with a first pressure-sensitive resistor and a second pressure-sensitive resistor, and the first pressure-sensitive resistor includes at least two first sub-pressure sensitive resistors connected in series, and the second pressure-sensitive resistor includes at least two second sub-pressure sensitive resistors connected in series, the first sub-pressure sensitive resistors are provided corresponding to the second sub-pressure sensitive resistors, respectively, so as to form at least two pressure-sensitive resistor pairs, and also the first end of the first pressure-sensitive resistor is electrically connected with the first power input line, the second end of the first pressure-sensitive resistor and the first end of the second pressure-sensitive resistor is electrically connected with a pressure-sensitive signal output line, and the second end of the second pressure-sensitive resistor is electrically connected with a second power input line. With such an arrangement, since one of pressure-sensitive resistor pairs of each pressure sensor may be provided at a sensing location, the pressure sensor may be provided at at least two sensing locations, thereby greatly reducing the number of pressure sensors, and greatly reducing the number of pressure-sensitive signal output lines, so that wiring may be saved and simplified, and the process difficulty and cost may be lowered.

DETAILED DESCRIPTION

The application will be illustrated in detail in conjunction with the drawings and embodiments. It may be understood that, the embodiments described here are only set for explaining, rather than limiting, the application. Additionally, it further needs to be noted that, for convenient description, the drawings only show the parts related to the application, rather than the whole structure.

Figure 1:
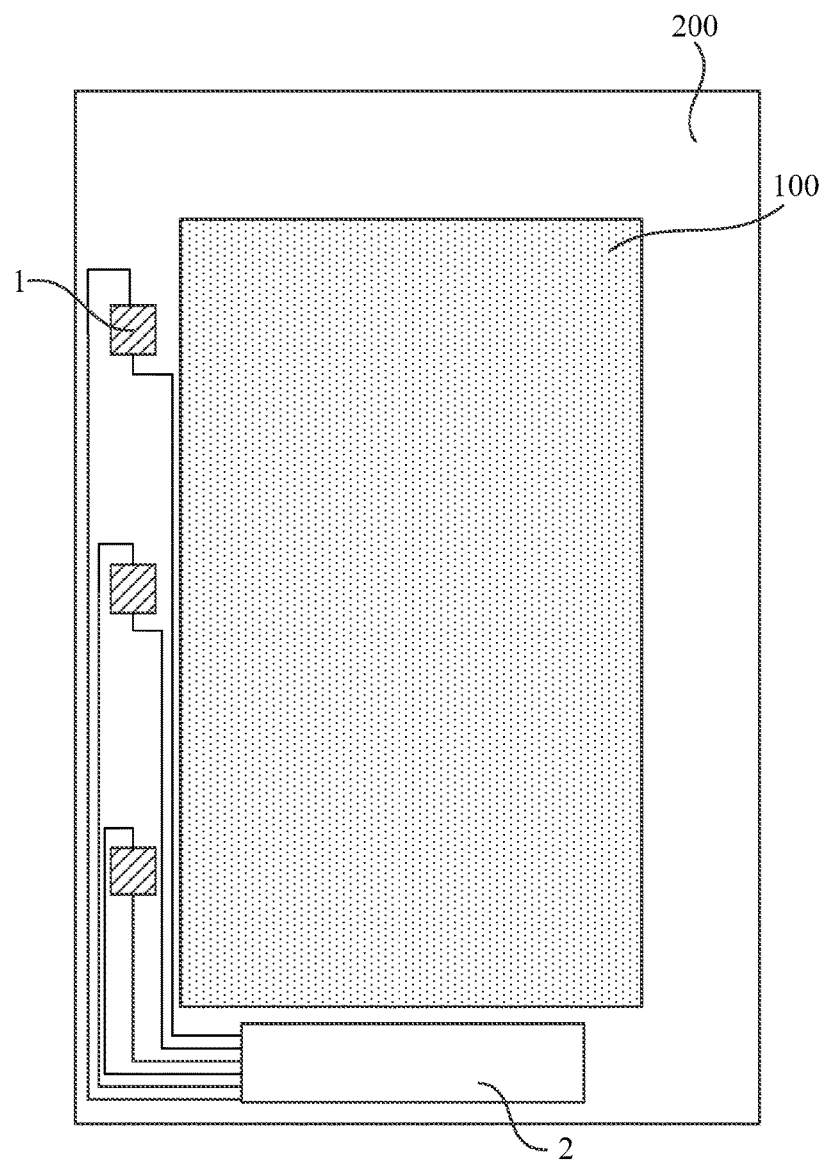
FIG. 1 is a structural representation of an existing display substrate.
Figure 2:
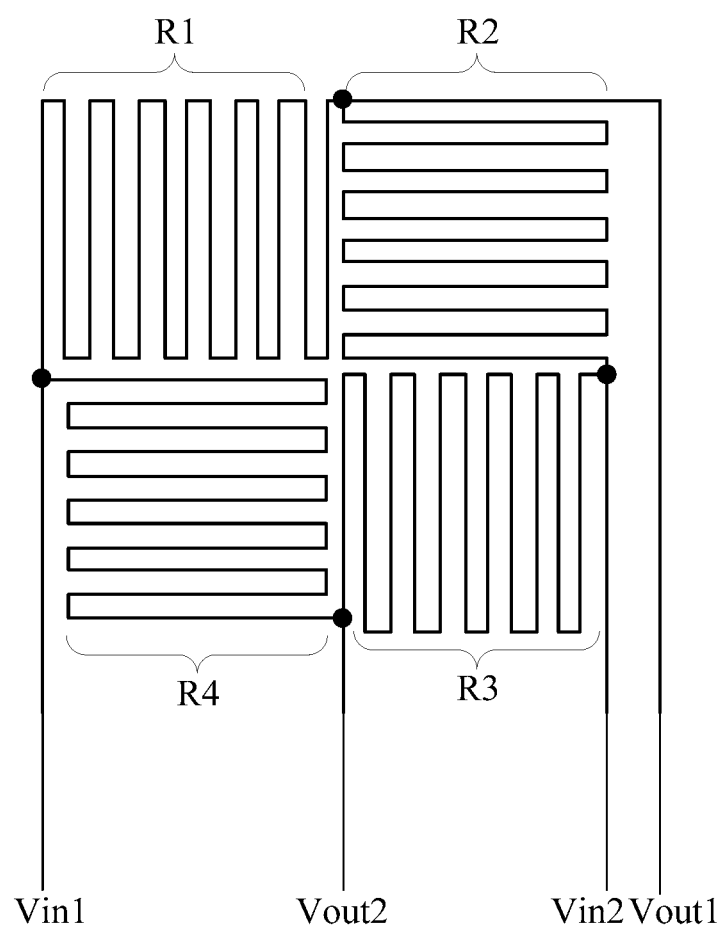
FIG. 2 is a structural representation of an existing pressure sensor.

FIG. 1 is a structural representation of an existing display substrate, and FIG. 2 is a structural representation of an existing pressure sensor. The cabling in FIG. 1 only shows the pressure-sensitive signal output line of the pressure sensor. As shown in FIG. 1 and FIG. 2, the display substrate includes a display region 100 and a non-display region 200 surrounding the display region 100. A side of a frame of the non-display region 200 is provided with a plurality of pressure sensors 1. Referring to FIG. 2, the pressure sensor 1 may include pressure-sensitive resistors R1, R2, R3 and R4; the first end of the pressure-sensitive resistor R1 and the first end of the pressure-sensitive resistor R4 are electrically connected with a first power input line Vin1, the second end of the pressure-sensitive resistor R1 and the first end of the pressure-sensitive resistor R2 are electrically connected with a first pressure-sensitive signal output line Vout1, the second end of the pressure-sensitive resistor R4 and the first end of the pressure-sensitive resistor R3 are electrically connected with a second pressure-sensitive signal output line Vout2, the second end of the pressure-sensitive resistor R2 and the second end of the pressure-sensitive resistor R3 are electrically connected with a second power input line Vin1, and the first pressure-sensitive signal output line Vout1 and the second pressure-sensitive signal output line Vout2 of each of the pressure sensors are electrically connected with a pressure-sensitive detection circuit 2 located in the display region 200. Thus, it may be seen that such an existing pressure sensor 1 requires two pressure-sensitive signal output lines (Vout1 and Vout2), and when a plurality of pressure sensors are provided on the frame, the arrangement of wirings of the pressure-sensitive signal output lines will be very complex, which may cause a difficult process for arranging wirings.

Figure 3:
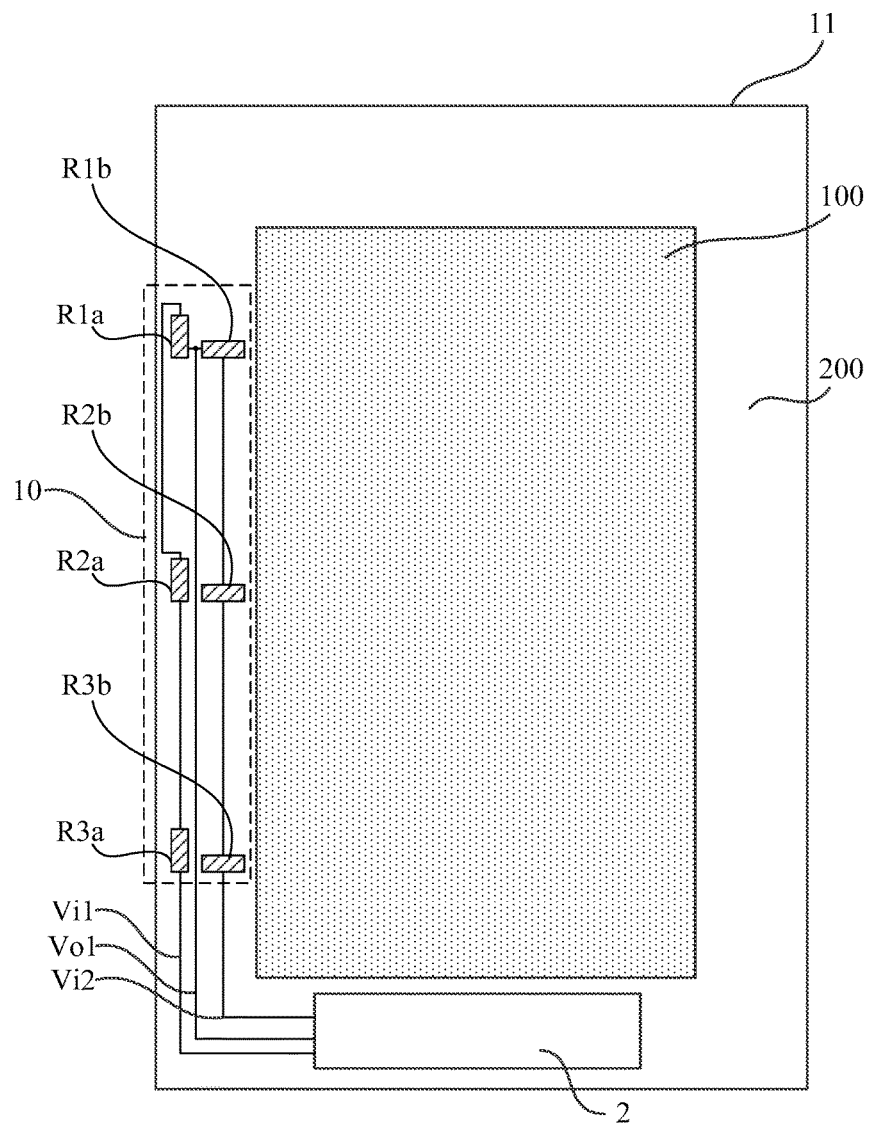
FIG. 3 is a structural representation of a display substrate according to an embodiment of the disclosure.
Figure 4:
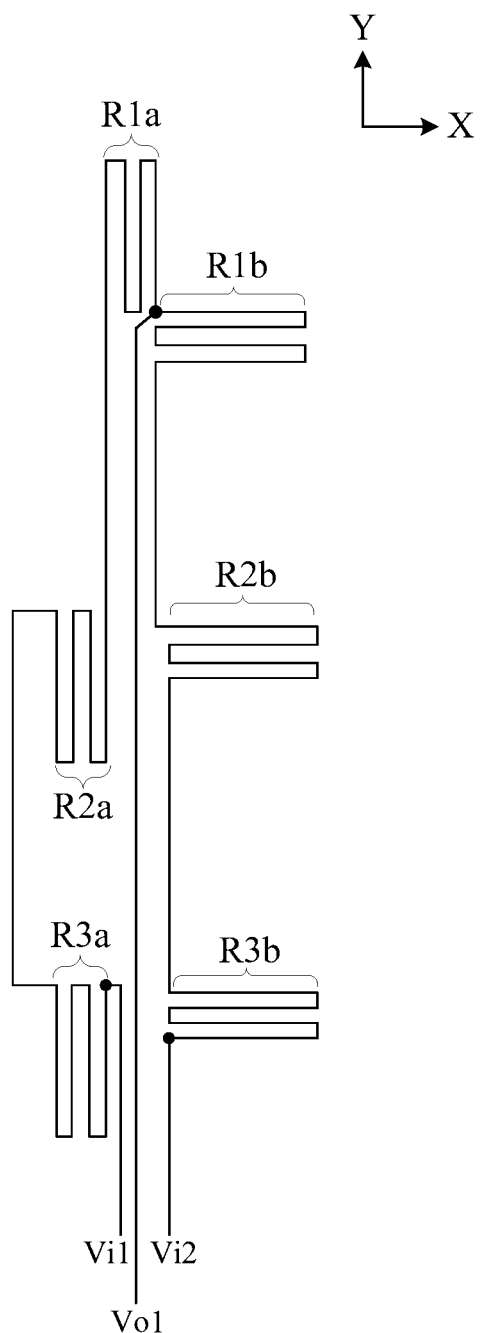
FIG. 4 is a structural representation of a pressure sensor according to an embodiment of the disclosure.

Based on the above problem, one embodiment of the application provides a display substrate, a display panel and display device. FIG. 3 is a structural representation of a display substrate according to an embodiment of the disclosure, and FIG. 4 is a structural representation of a pressure sensor according to an embodiment of the disclosure. FIG. 3 shows a Wheatstone half bridge structure of a pressure sensor according to an embodiment of the disclosure, wherein each rectangular frame in the pressure sensor 10 represents a sub-pressure sensitive resistor. It needs to be noted that, FIG. 3 is merely a schematic diagram, and the shape of the sub-pressure sensitive resistor is not limited to a rectangle, but may also be a polygonal line shown in FIG. 4. Each rectangular frame in the pressure sensor 10 in the FIG. 6-FIG. 12 represents a sub-pressure sensitive resistor. FIG. 6-FIG. 12 are also merely schematic diagrams, and the shape of the sub-pressure sensitive resistor is not limited to a rectangle, but may also be a polygonal line shown in FIG. 4.

As shown in FIG. 3 and FIG. 4, the display substrate according to the embodiment of the disclosure includes: a base substrate 11, which includes a display region 100 and a non-display region 200 surrounding the display region 100; at least one pressure sensor 10, which is provided on the base substrate 11 and includes a first pressure-sensitive resistor and a second pressure-sensitive resistor, the first pressure-sensitive resistor includes at least two first sub-pressure sensitive resistors connected in series, as shown in FIG. 4, the pressure-sensitive resistors R1a, R2a and R3a are first sub-pressure sensitive resistors, and the second pressure-sensitive resistor includes at least two second sub-pressure sensitive resistors connected in series, as shown in FIG. 4, the pressure-sensitive resistors R1b, R2b and R3b are second sub-pressure sensitive resistors.

The first sub-pressure sensitive resistor has a first principal strain induction direction Y, the second sub-pressure sensitive resistor has a second principal strain induction direction X, and the first principal strain induction direction Y is intersected with the second principal strain induction direction X.

The first sub-pressure sensitive resistors are provided corresponding to the second sub-pressure sensitive resistors, respectively, (that is the first sub-pressure sensitive resistors correspond to the second sub-pressure sensitive resistors in a one-to-one relationship), so as to form at least two pressure-sensitive resistor pairs each including one of the first sub-pressure sensitive resistors and one of the second sub-pressure sensitive resistors; exemplarily, as shown in FIG. 4, sub-pressure sensitive resistors R1a and R1b, sub-pressure sensitive resistors R2a and R2b and sub-pressure sensitive resistors R3a and R3b are three pressure-sensitive resistor pairs, and correspondingly, each of the rectangular frames in the pressure sensor 10 in FIG. 3 represents a pressure-sensitive resistor pair. In each pressure-sensitive resistor pair, a point on the first sub-pressure sensitive resistor which is farthest from the second sub-pressure sensitive resistor represents a first point, and a point on the second sub-pressure sensitive resistor which is farthest from the first sub-pressure sensitive resistor represents a second point, and a distance from the first point to the second point is less than or equal to 5 mm.

The display substrate further includes: a pressure-sensitive signal line. Referring to FIG. 4, the pressure-sensitive signal line includes a first power input line Vi1, a second power input line Vi2 and a pressure-sensitive signal output line Vo1, wherein the first power input line Vi1 and the second power input line Vi2 are configured to input a pressure-sensitive reference signal to the pressure sensor 10, the pressure-sensitive signal output line Vo1 is configured to output a pressure-sensitive signal from the pressure sensor 10.

The first end of the first pressure-sensitive resistor is electrically connected with the first power input line Vi1, the second end of the first pressure-sensitive resistor and the first end of the second pressure-sensitive resistor are electrically connected with the pressure-sensitive signal output line Vo1, and the second end of the second pressure-sensitive resistor is electrically connected with the second power input line Vi2.

Still referring to FIG. 4, in the embodiment of the disclosure, the first pressure-sensitive resistor and the second pressure-sensitive resistor may form a Wheatstone half bridge structure. When a pressure-sensitive reference signal is input to the pressure sensor 10 via the first power input line Vi1 and the second power input line Vi2, current may be formed in the Wheatstone half bridge structure. At this time, when the display panel is not pressed, a reference voltage is output from the pressure-sensitive signal output line Vo1. When the display panel is pressed, under the action of a shear force at the corresponding location on the display panel, the resistance values of the first sub-pressure sensitive resistor and the second sub-pressure sensitive resistor in the pressure-sensitive resistor pair at the corresponding sensing location are changed, so that the resistance values of the first pressure-sensitive resistor and the second pressure-sensitive resistor are changed, and hence the voltage output from the pressure-sensitive signal output line Vo1 changes. Therefore, the magnitude of the touch pressure may be determined according to different differences between the voltage output from the pressure-sensitive signal output line Vo1 and the reference voltage when the display panel is pressed.

It needs to be noted that, because the pressure sensor is provided on the display panel, when a pressure is applied to the display panel, the display panel is deformed, and hence both the first sub-pressure sensitive resistor and the second sub-pressure sensitive resistor provided on the display panel will be deformed. In order to detect the magnitude of a pressure, the deformations of the first sub-pressure sensitive resistor and the second sub-pressure sensitive resistor are needed to be different from each other. Therefore, in the embodiment of the disclosure, the first sub-pressure sensitive resistor has a first principal strain induction direction Y, the second sub-pressure sensitive resistor has a second principal strain induction direction X, and the first principal strain induction direction Y is intersected with the second principal strain induction direction X. In this arrangement, the first sub-pressure sensitive resistor may sense the strain in the first principal strain induction direction Y, and the second sub-pressure sensitive resistor may sense the strain in the second principal strain induction direction X, thereby greatly lowering the probability that the deformations of the first sub-pressure sensitive resistor and the second sub-pressure sensitive resistor in each pressure-sensitive resistor pair are the same. Further, because the first principal strain induction direction Y is different from the second principal strain induction direction X, the first sub-pressure sensitive resistor and the second sub-pressure sensitive resistor in each pressure-sensitive resistor pair are distributed at the same location or approximate locations in the embodiment of the disclosure.

Further, in consideration of the temperature effect, in the embodiment of the disclosure, the size of the pressure-sensitive resistor pair is designed based on the relational expression below:

$$\alpha * L * \eta < \varepsilon * GF$$

wherein, $\alpha$ is a resistor temperature coefficient of the pressure sensor; $L$ is the size of the pressure-sensitive resistor pair, which refers to a distance from the first point on the first sub-pressure sensitive resistor farthest from the second sub-pressure sensitive resistor to the second point on the second sub-pressure sensitive resistor farthest from the first sub-pressure sensitive resistor; $\eta$ is the temperature gradient change in the display panel; $\varepsilon$ is the magnitude of deformation to be measured; and GF is a sensing factor of the pressure sensor. Therefore, to realize pressure detection, the affection of temperature on the pressure-sensitive resistor needs to be less than the affection of deformation on the pressure-sensitive resistor.

Based on the above relational expression, for a semiconductor pressure sensor, when the magnitude of deformation to be measured is 5E-5, the sensing factor of the pressure sensor is 50, the resistor temperature coefficient of the pressure sensor is 5E-3, and the temperature gradient change in the display panel is 0.1° C./mm, the size of the pressure-sensitive resistor pair will be no larger than 5 mm. Therefore, in the embodiment of the disclosure, in each pressure-sensitive resistor pair, the distance from the first point on the first sub-pressure sensitive resistor which is farthest from the second sub-pressure sensitive resistor to the second point on the second sub-pressure sensitive resistor which is farthest from the first sub-pressure sensitive resistor is less than or equal to 5 mm, thereby reducing the affection of the temperature difference between the first sub-pressure sensitive resistor and the second sub-pressure sensitive resistor and improving the pressure sensing precision.

Additionally, each pressure-sensitive resistor pair is configured to detect the magnitude of pressure in a range to which it may respond, and at least two pressure-sensitive resistor pairs are provided at different sensing locations according to the response range of the pressure-sensitive resistor pair. For example, in FIG. 3, three pressure-sensitive resistor pairs are respectively located on the upper part, the middle part and the lower part of a frame region.

In summary, in the embodiments of the disclosure, a first pressure-sensitive resistor and a second pressure-sensitive resistor are provided in each pressure sensor, and the first pressure-sensitive resistor includes at least two first sub-pressure sensitive resistors connected in series, the second pressure-sensitive resistor includes at least two second sub-pressure sensitive resistors connected in series, the first sub-pressure sensitive resistors are provided corresponding to the second sub-pressure sensitive resistors in a one-to-one relationship, in order to form at least two pressure-sensitive resistor pairs. Moreover, the first end of the first pressure-sensitive resistor is electrically connected with the first power input line, the second end of the first pressure-sensitive resistor and the first end of the second pressure-sensitive resistor are electrically connected with a pressure-sensitive signal output line, and the second end of the second pressure-sensitive resistor is electrically connected with a second power input line. Therefore, since each of pressure-sensitive resistor pairs of each pressure sensor may be provided at a sensing location, the pressure sensor is equivalent to being provided at at least two sensing locations, thereby reducing the number of pressure sensors, so that the number of pressure-sensitive signal output lines may be reduced, the wirings may be saved and simplified, and the process difficulty and cost may be lowered.

Figure 5:
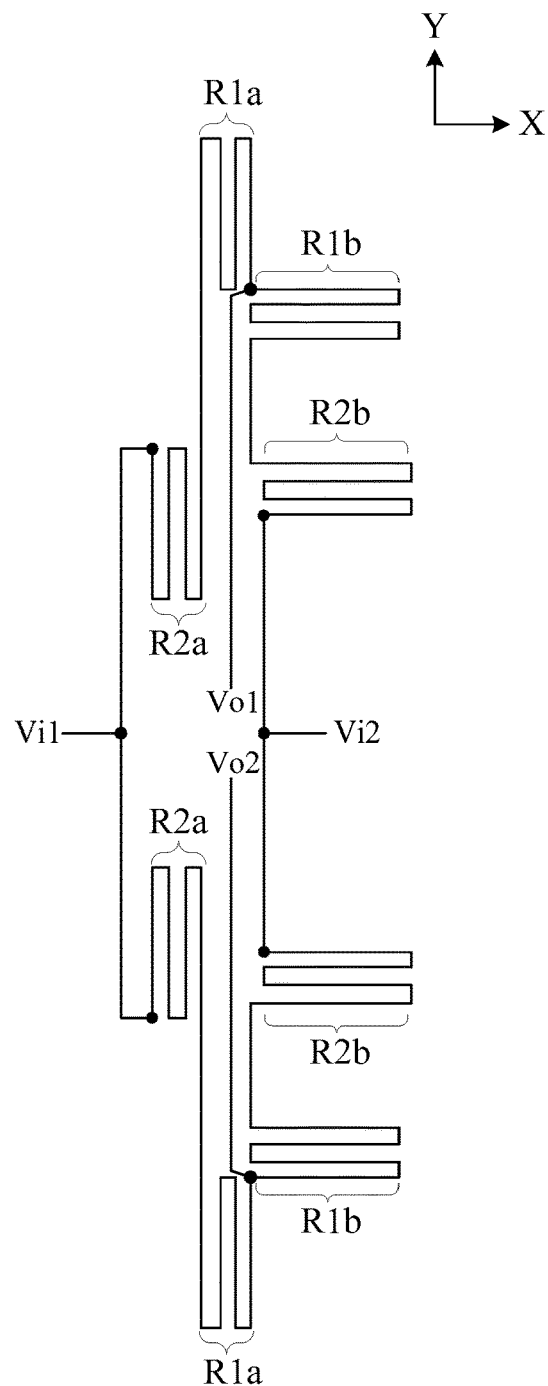
FIG. 5 is a schematic diagram of a pressure sensor with a Wheatstone full bridge structure according to an embodiment of the disclosure.

In one embodiment, based on the above embodiments, the first power input lines of at least two pressure sensors are electrically connected with each other, and the second power input lines thereof are electrically connected with each other. Exemplarily, the first power input lines of every two the pressure sensors are electrically connected with each other, and second power input lines thereof are electrically connected with each other, so that a Wheatstone full bridge structure may be formed. As shown in FIG. 5, the two pressure sensors include two first sub-pressure sensitive resistors R1a and R2a connected in series and two second sub-pressure sensitive resistors R1b and R2b connected in series, the first power input lines Vi1 of the two pressure sensors are electrically connected with each other, the second power input lines Vi2 thereof are electrically connected with each other, and the corresponding pressure-sensitive signal output lines Vo1 and Vo2 are electrically connected to a pressure-sensitive detection circuit, respectively. At this time, according to the touch pressure determination method in the above embodiments, the magnitude of a touch pressure may be determined based on difference between the voltages output by the pressure-sensitive signal output lines Vo1 and Vo2 and the reference voltage; or, according to an existing touch pressure detection method for a Wheatstone full bridge structure, the difference between the voltages output by the pressure-sensitive signal output lines Vo1 and Vo2 when the display panel is not pressed may be first determined (in one embodiment, when the resistance values of the first sub-pressure sensitive resistor and the second sub-pressure sensitive resistor are equal to each other, the difference between the voltages output by the pressure-sensitive signal output lines Vo1 and Vo2 is zero), and then, when the display panel is pressed, the magnitude of the touch pressure may be determined according to the difference between the voltages output by the pressure-sensitive signal output lines Vo1 and Vo2. In the Wheatstone full bridge structure, each pressure sensor includes at least two pressure-sensitive resistor pairs. In comparison with the prior art, the number of pressure sensors may be reduced, thereby reducing the number of pressure-sensitive signal output lines.

It needs to be noted that, FIG. 5 merely exemplarily shows the location relation between two pressure sensors in the Wheatstone full bridge structure. Optionally, the pressure-sensitive resistor pairs in the two pressure sensors may be arranged alternately; wherein, a pressure-sensitive resistor pair of one pressure sensor and a pressure-sensitive resistor pair of another pressure sensor may be distributed at the same spatial location or approximate locations; the pressure-sensitive resistor pairs in the two pressure sensors may be arranged along the same direction or different directions, which are not limited in the embodiments of the disclosure, so long as the first power input lines of two pressure sensors are electrically connected with each other and the second power input lines thereof are electrically connected with each other.

In one embodiment, the first principal strain induction direction may be perpendicular to the second principal strain induction direction. Therefore, the difference the deformations between the first sub-pressure sensitive resistor and the second sub-pressure sensitive resistor is the maximum, and hence the difference the resistances between the first sub-pressure sensitive resistor and the second sub-pressure sensitive resistor will be the maximum, so that the change of the voltage output by the pressure-sensitive signal output line will be significant relative to the reference voltage. Therefore, the first principal strain induction direction is perpendicular to the second principal strain induction direction, thereby improving the pressure sensing precision.

In one embodiment, the distance from the first point on the first sub-pressure sensitive resistor which is farthest from the second sub-pressure sensitive resistor to the second point on the second sub-pressure sensitive resistor which is farthest from the first sub-pressure sensitive resistor is less than or equal to 1 mm. Under this arrangement, the affection of temperature on the pressure-sensitive resistor is much less than the affection of deformation on the pressure-sensitive resistor, thereby improving the pressure sensing precision.

In one embodiment, in the embodiment of the disclosure, the non-display region includes four frame regions surrounding the display region, and at least one pressure sensor is provided in at least one frame region. In this embodiment, illustration will be given via the above Wheatstone half bridge structure.

Figure 6:
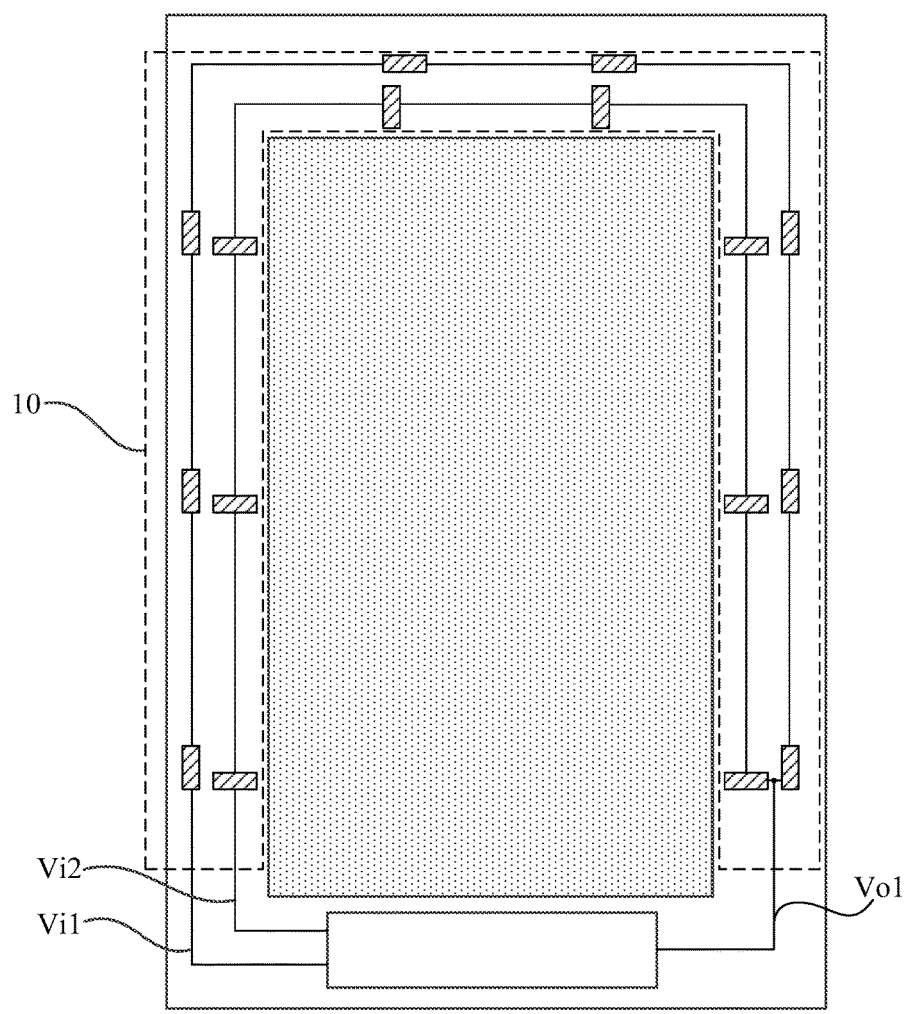
FIG. 6 is a structural representation of another display substrate according to an embodiment of the disclosure.

Exemplarily, one pressure sensor is provided in at least one frame region. Referring to FIG. 3, one pressure sensor 10 is provided in one frame region, so that pressure sensing on a display panel may be realized by only one pressure sensor and one pressure-sensitive signal output line. Referring to FIG. 6, one pressure sensor 10 may also be provided in three frame regions, that is, the pressure sensor 10 may be distributed as a whole in three frame regions in a form of a polygonal line, and each frame region is provided with a pressure-sensitive resistor pair. Therefore, the distribution of the pressure-sensitive resistor pairs will be uniform, and the strong pressure-sensitive signal may be sensed at different touch locations, thereby improving the pressure sensing precision.

Figure 7:
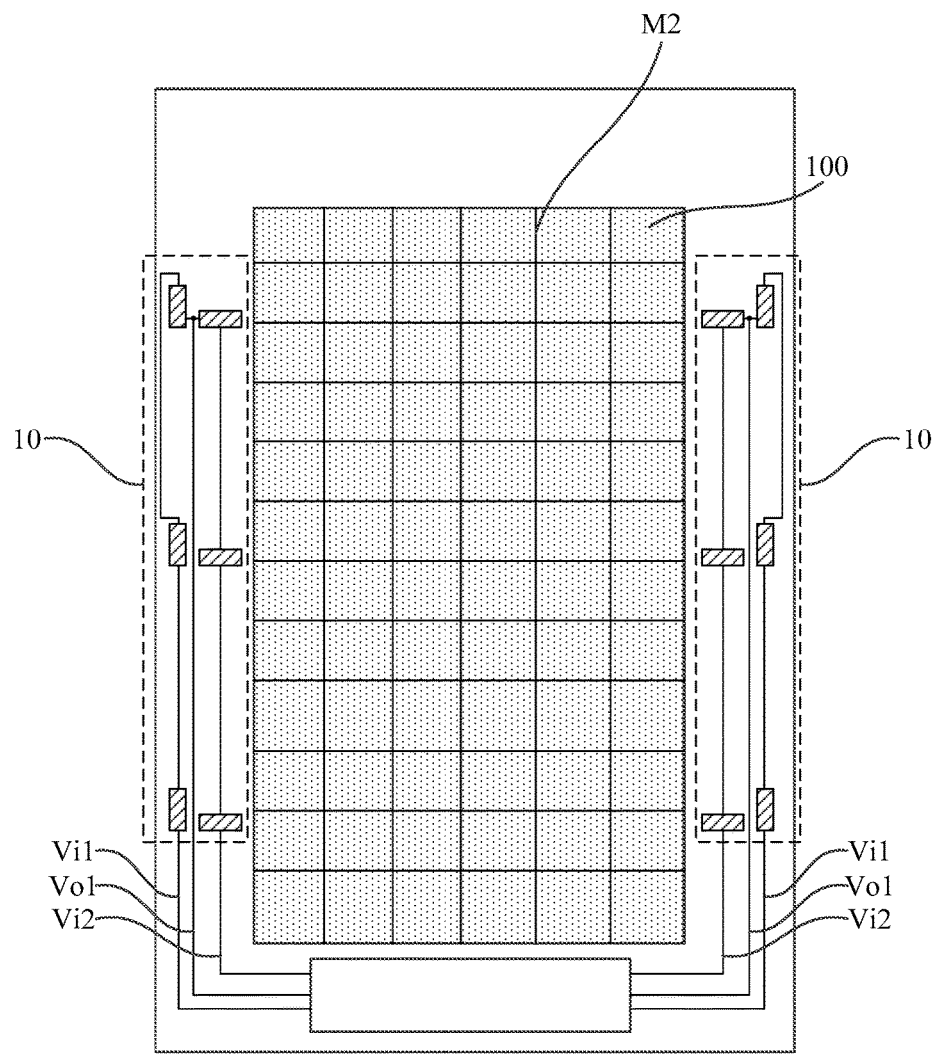
FIG. 7 is a structural representation of another display substrate according to an embodiment of the disclosure.

In one embodiment, two or more pressure sensors may be separately provided in different frame regions. Exemplarily, the four frame regions include a first frame region and a second frame region provided opposite to each other, wherein the first frame region and the second frame region each are provided with one pressure sensor. Referring to FIG. 7, the display region 100 is provided with a data line M2, the long side direction of the first frame region 201 and the second frame region 202 is parallel to the extension direction of the data line M2, and the first frame region 201 and the second frame region 202 each are provided with one pressure sensor 10. Therefore, a pressure sensor nearest to a touch location may be selected according to the touch location so as to sense the touch pressure, thereby improving the pressure sensing precision.

In one embodiment, the first frame region may include a first gate drive circuit region, the second frame region may include a second gate drive circuit region, and the pressure sensors may be respectively provided in the first gate drive circuit region and the second gate drive circuit region. Exemplarily, both the first gate drive circuit region and the second gate drive circuit region each are provided with a plurality of shift registers arranged along the extension direction of the data line. A pressure-sensitive resistor pair may be provided between adjacent two shift registers, and the first sub-pressure sensitive resistor and the second sub-pressure sensitive resistor in each pressure-sensitive resistor pair includes a metal material or a semiconductor material. In one embodiment, the first sub-pressure sensitive resistor and the second sub-pressure sensitive resistor includes a metal material, and hence the first sub-pressure sensitive resistor and the second sub-pressure sensitive resistor may be provided on the same layer as the source electrode or the drain electrode of a thin-film transistor in the shift register; or, the first sub-pressure sensitive resistor and the second sub-pressure sensitive resistor includes a semiconductor material, and hence the first sub-pressure sensitive resistor and the second sub-pressure sensitive resistor may be provided on the same layer as the active layer of a thin-film transistor in the shift register. In one embodiment, the active layer includes polysilicon. Additionally, the connection line inside each pressure sensor is provided on different layers from the film layers of the shift register and is electrically connected with the corresponding sub-pressure sensitive resistor by a via hole. In one embodiment, the pressure-sensitive resistor pairs in each pressure sensor are arranged along the extension direction of the data line.

In this embodiment, one frame region may be provided with three pressure-sensitive resistor pairs. However, in the embodiments of the disclosure, it is not limited to the arrangement that one frame region is provided with three pressure-sensitive resistor pairs; instead, the number of pressure-sensitive resistor pairs in one frame region may be provided according to the sensing precision or the response range of the pressure-sensitive resistor pair. For example, the higher the sensing precision of the pressure-sensitive resistor pair is or the larger the response range of the pressure-sensitive resistor pair is, the smaller the number of pressure-sensitive resistor pairs provided in one frame region will be.

Moreover, in addition to the arrangement that the pressure sensor is provided in the frame region as described in the above embodiment, the pressure sensor according to the embodiment of the disclosure may also be provided in a display region. In one embodiment, the pressure sensor may be provided in a non-light transmission area of the display region to avoid affecting the display effect.

Figure 8:
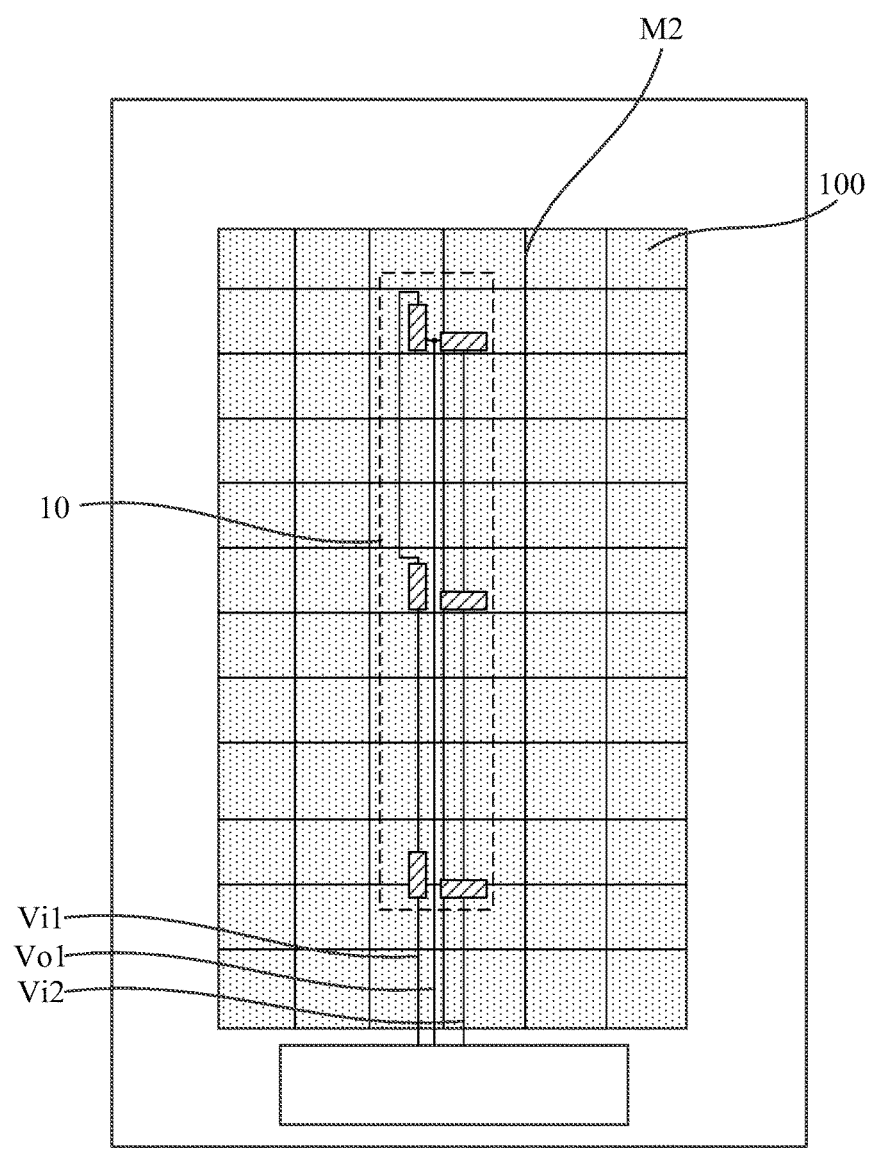
FIG. 8 is a structural representation of another display substrate according to an embodiment of the disclosure.
Figure 9:
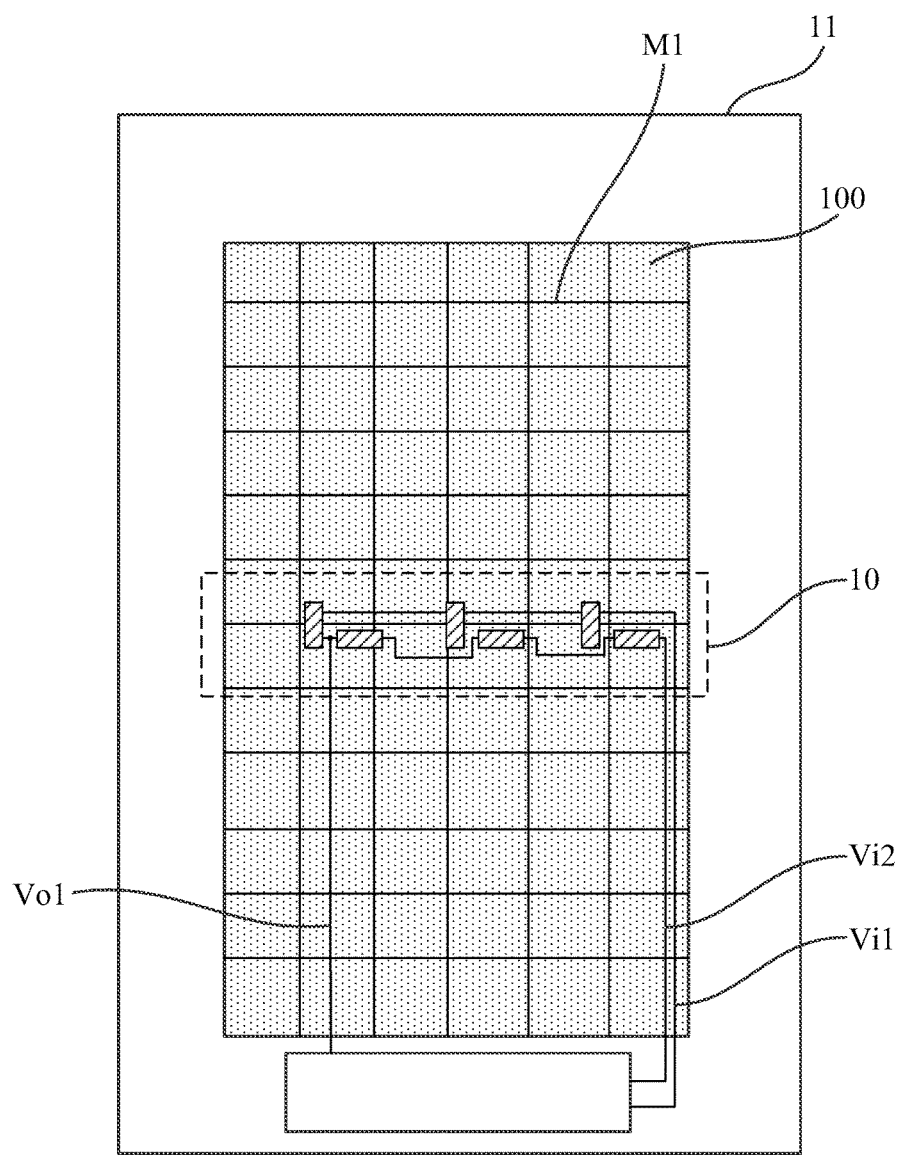
FIG. 9 is a structural representation of another display substrate according to an embodiment of the disclosure.
Figure 10:
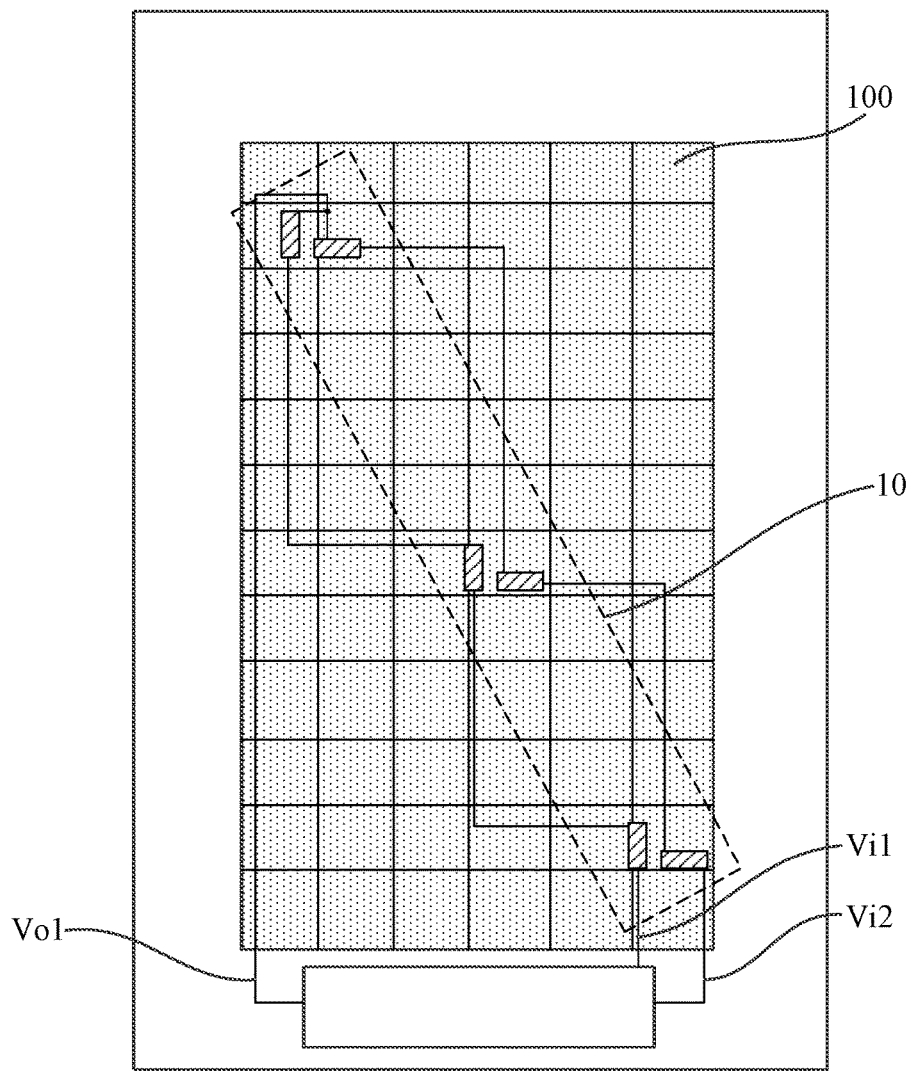
FIG. 10 is a structural representation of another display substrate according to an embodiment of the disclosure.

In one embodiment, the display region may be provided with at least one of the pressure sensors according to any of the above embodiments, and the pressure-sensitive resistor pairs in each pressure sensor are arranged at least along a first direction. For example, as similar to the arrangement that one pressure sensor is provided in one frame region in the above embodiments, in this embodiment, one pressure sensor may be provided in the display region. Referring to FIG. 8, the pressure-sensitive resistor pairs in the pressure sensor 10 may be arranged along the extension direction of the data line M2; referring to FIG. 9, the pressure-sensitive resistor pairs in the pressure sensor 10 may also be arranged along the extension direction of a scanning line M1; referring to FIG. 10, the pressure-sensitive resistor pairs in the pressure sensor 10 may also be arranged along the diagonal of the display region. The pressure-sensitive resistor pairs in the pressure sensor may also be arranged along any other directions, which is not limited in this embodiment.

Figure 11:
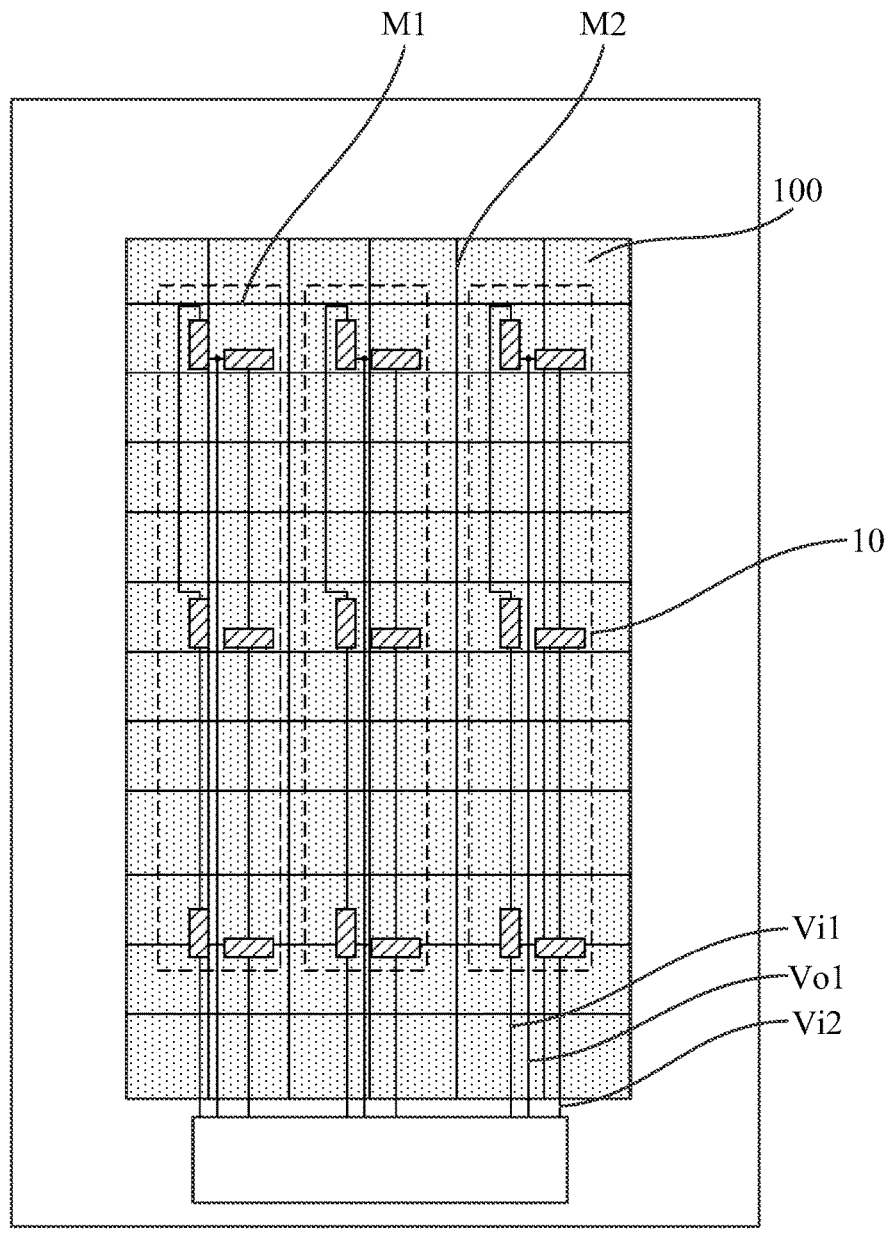
FIG. 11 is a structural representation of another display substrate according to an embodiment of the disclosure.

In one embodiment, the pressure-sensitive resistor pairs in each pressure sensor are arranged along the first direction; the display region is provided with a plurality of pressure sensors arranged along a second direction, and the second direction is intersected with the first direction. The first direction may be parallel or perpendicular to the extension direction of the data line, and the second direction may be perpendicular to the first direction. Exemplarily, referring to FIG. 11, a plurality of (three as shown in FIG. 11) pressure sensors 10 are arranged along the extension direction of the scanning line M1, the pressure-sensitive resistor pairs in each pressure sensor 10 are arranged along the extension direction of the data line M2. In one embodiment, a plurality of pressure sensors 10 are arranged uniformly along the extension direction of the scanning line M1, the pressure-sensitive resistor pairs in each pressure sensor 10 are arranged uniformly along the extension direction of the data line M2, and a pressure sensor nearest to a touch location may be selected according to the touch location to sense the touch pressure, thereby improving the pressure sensing precision.

Figure 12:
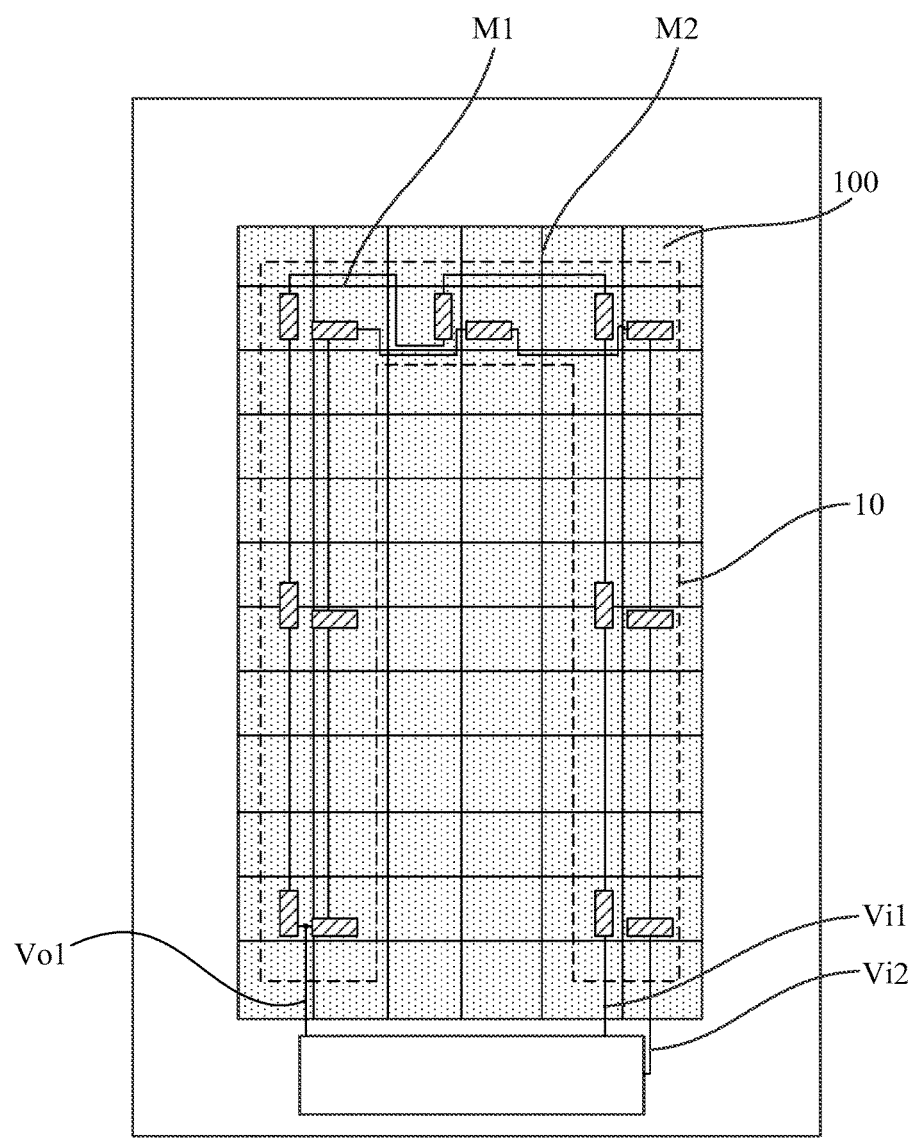
FIG. 12 is a structural representation of another display substrate according to an embodiment of the disclosure.

Additionally, the pressure-sensitive resistor pairs in one pressure sensor may be arranged along different directions. Referring to FIG. 12, the pressure sensors 10 are arrange along the extension direction of the data line M2, the extension direction of the scanning line M1 and the extension direction of the data line M2 successively, so that the pressure sensors as a whole are arranged in a form of a polygonal line.

In the embodiment of the disclosure, when a plurality of pressure sensors are provided in the display region, any one or a combination of the above pressure sensors may be provided.

In one embodiment, a ratio of the first sub-pressure sensitive resistor to the second sub-pressure sensitive resistor of each of the pressure-sensitive resistor pairs may be the same with that of other pressure-sensitive resistor pairs. Exemplarily, referring to FIG. 4, wherein, R1$a$/R1$b$=R2$a$/R2$b$=R3$a$/R3$b$, so that the ratio of the first pressure-sensitive resistor to the second pressure-sensitive resistor will not be affected by the temperature, and hence the resistance value of the first pressure-sensitive resistor and the second pressure-sensitive resistor can only be changed via deformation, thereby further improving the precision of pressure sensing.

In one embodiment, still referring to FIG. 4, the component of the extension length of the first sub-pressure sensitive resistor from the first end to the second end in a first extension direction is larger than the component thereof in a second extension direction, and the component of the extension length of the second sub-pressure sensitive resistor from the first end to the second end in the second extension direction is larger than the component thereof in the first extension direction; wherein, the first extension direction is intersected with the second extension direction, the first extension direction represents the first principal strain induction direction Y, and the second extension direction represents the second principal strain induction direction X.

In one embodiment, the first sub-pressure sensitive resistor and the second sub-pressure sensitive resistor are arranged in a form of a polygonal line. On one hand, it may guarantee that the size of the first sub-pressure sensitive resistor and the second sub-pressure sensitive resistor may be reduced while the first sub-pressure sensitive resistor and the second sub-pressure sensitive resistor have a large reference resistance value, so that the first sub-pressure sensitive resistor and the second sub-pressure sensitive resistor may be distributed in a small region, eliminating and the affection of temperature difference; on the other hand, the contact areas between the first sub-pressure sensitive resistor, the second sub-pressure sensitive resistor and the display substrate may be increased, so that the first sub-pressure sensitive resistor and the second sub-pressure sensitive resistor may sense the strain of the display substrate more precisely, thereby improving the pressure sensing precision.

In one embodiment, the display substrate according to any of the above embodiments may include an array substrate or a color filter substrate.

An embodiment of the disclosure further provides a display panel, which includes the display substrate according to any of the above embodiments. The display panel may be an organic light-emitting display panel or a liquid crystal display panel.

Figure 13:
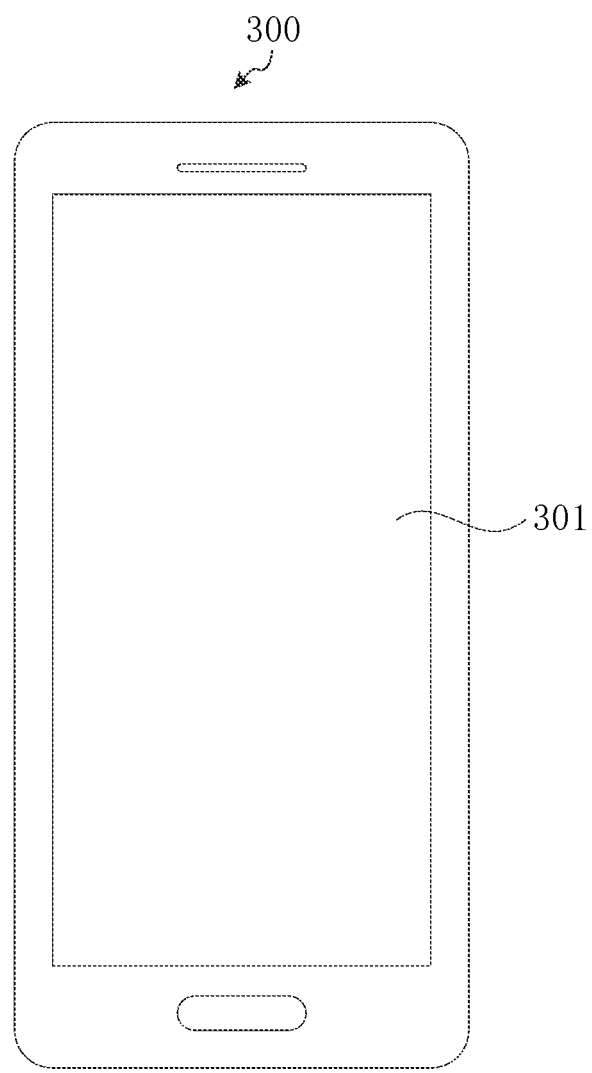
FIG. 13 is a structural representation of a display device according to an embodiment of the disclosure.

An embodiment of the disclosure further provides a display device; as shown in FIG. 13, the display device 300 includes the display panel 301 according to the above embodiment.

The display device 300 may be a mobile phone, a computer, a TV set and an intelligent wearable display device, etc., which is not specifically defined in this embodiment.

It should be noted that the embodiments of the present invention and the technical principles used therein are described as above. It should be appreciated that the invention is not limited to the particular embodiments described herein, and any apparent alterations, modification and substitutions can be made without departing from the scope of protection of the invention. Accordingly, while the invention is described in detail through the above embodiments, the invention is not limited to the above embodiments and can further include other additional embodiments without departing from the concept of the invention.

What is claimed is:

1. A display substrate, comprising:
   a base substrate, which comprises a display region and a non-display region surrounding the display region;
   at least one pressure sensor, which is provided on the base substrate and comprises a first pressure-sensitive resistor and a second pressure-sensitive resistor, the first pressure-sensitive resistor comprises at least two first sub-pressure sensitive resistors connected in series, and the second pressure-sensitive resistor comprises at least two second sub-pressure sensitive resistors connected in series; wherein
   each of the at least two first sub-pressure sensitive resistors has a first principal strain induction direction, each of the at least two second sub-pressure sensitive resistors has a second principal strain induction direction, and the first principal strain induction direction is intersected with the second principal strain induction direction;
   the at least two first sub-pressure sensitive resistors are configured to correspond with the at least two second sub-pressure sensitive resistors, respectively; each of at least two pressure-sensitive resistor pairs comprises one of the at least two first sub-pressure sensitive resistors and one of the at least two second sub-pressure sensitive resistors; in each of the pressure-sensitive resistor pairs, a point, which is farthest from the second sub-pressure sensitive resistor, on the first sub-pressure sensitive resistor is a first point, a point, which is farthest from the first sub-pressure sensitive resistor, on the second sub-pressure sensitive resistor is a second point, and a distance between the first point to the second point is less than or equal to 5 mm; each of the at least two pressure-sensitive resistor pairs is configured to detect a magnitude of pressure in a range to which each of the at least two pressure-sensitive resistor pairs responds; and the at least two pressure-sensitive resistor pairs are configured at different sensing locations according to response ranges of the at least two pressure-sensitive resistor pairs; and
   a pressure-sensitive signal line comprising a first power input line, a second power input line and a pressure-sensitive signal output line, wherein the first power input line and the second power input line are configured to input a pressure-sensitive reference signal to the pressure sensor, and the pressure-sensitive signal output line is configured to output a pressure-sensitive signal from the pressure sensor;
   wherein, a first end of the first pressure-sensitive resistor is electrically connected with the first power input line, a second end of the first pressure-sensitive resistor and a first end of the second pressure-sensitive resistor are electrically connected with the pressure-sensitive signal output line, and a second end of the second pressure-sensitive resistor is electrically connected with the second power input line;
   wherein, in response to determining that there are at least two pressure sensors, first power input lines corresponding to the at least two pressure sensors are electrically connected with each other, and second power input lines corresponding to the at least two pressure sensors are electrically connected with each other.

2. The display substrate as claimed in claim 1, wherein the first principal strain induction direction is perpendicular to the second principal strain induction direction;
a second distance between the first point to the second point, wherein the second distance is less than or equal to 1 mm.

3. The display substrate as claimed in claim 1, wherein the non-display region comprises four frame regions surrounding the display region; and
at least one of the pressure sensors is provided in at least one of the frame regions.

4. The display substrate as claimed in claim 3, wherein one of the pressure sensors is provided in at least one of the frame regions.

5. The display substrate as claimed in claim 4, wherein one of the pressure sensors is provided over three of the frame regions.

6. The display substrate as claimed in claim 3, wherein the four frame regions comprise a first frame region and a second frame region provided opposite to each other, and the first frame region and the second frame region each are provided with one of the pressure sensors.

7. The display substrate as claimed in claim 6, wherein the display region is provided with a data line, and a long side direction of the first frame region and the second frame region is parallel to an extension direction of the data line.

8. The display substrate as claimed in claim 7, wherein the first frame region comprises a first gate drive circuit region, the second frame region comprises a second gate drive circuit region, and the pressure sensors are provided in the first gate drive circuit region and the second gate drive circuit region, respectively.

9. The display substrate as claimed in claim 7, wherein the pressure-sensitive resistor pairs are arranged along the extension direction of the data line.

10. The display substrate as claimed in claim 3, wherein three of the pressure-sensitive resistor pairs are provided in one of the frame regions.

11. The display substrate as claimed in claim 1 wherein at least one of the pressure sensors is provided in the display region; and
the pressure-sensitive resistor pairs in each of the pressure sensors are arranged at least along a first direction.

12. The display substrate as claimed in claim 11, wherein the pressure-sensitive resistor pairs in each of the pressure sensors are arranged along the first direction; and
the pressure sensors are arranged in the display region along a second direction, and the second direction is intersected with the first direction.

13. The display substrate as claimed in claim 12, wherein the display region is provided with data lines, the first direction is parallel to the extension direction of the data lines, and the second direction is perpendicular to the first direction.

14. The display substrate as claimed in claim 1, wherein a ratio of the first sub-pressure sensitive resistor to the second sub-pressure sensitive resistor of each of the pressure-sensitive resistor pairs is the same with that of other pressure-sensitive resistor pairs.

15. The display substrate as claimed in claim 1, wherein a component of an extension length of the first sub-pressure sensitive resistor from the first end to the second end in a first extension direction is larger than a component thereof in a second extension direction, and a component of an extension length of the second sub-pressure sensitive resistor from the first end to the second end in the second extension direction is larger than a component thereof in the first extension direction; wherein the first extension direction is intersected with the second extension direction, the first extension direction is the first principal strain induction direction, and the second extension direction is the second principal strain induction direction.

16. The display substrate as claimed in claim 15, wherein the first sub-pressure sensitive resistors and the second sub-pressure sensitive resistors are both arranged in a form of a polygonal line.

17. The display substrate as claimed in claim 1, wherein each of the first sub-pressure sensitive resistor and the second sub-pressure sensitive resistor comprises one or more of: a metal material and a semiconductor material.

18. The display substrate as claimed in claim 1, wherein the display substrate comprises one or more of: an array substrate and a color filter substrate.

19. A display device, comprising a display panel which comprises a display substrate, wherein the display substrate comprises:

a base substrate, which comprises a display region and a non-display region surrounding the display region;

at least one pressure sensor, which is provided on the base substrate and comprises a first pressure-sensitive resistor and a second pressure-sensitive resistor, the first pressure-sensitive resistor comprises at least two first sub-pressure sensitive resistors connected in series, and the second pressure-sensitive resistor comprises at least two second sub-pressure sensitive resistors connected in series; wherein each of the at least two first sub-pressure sensitive resistors has a first principal strain induction direction, each of the at least two second sub-pressure sensitive resistors has a second principal strain induction direction, and the first principal strain induction direction is intersected with the second principal strain induction direction;

the at least two first sub-pressure sensitive resistors are configured to correspond with the at least two second sub-pressure sensitive resistors, respectively; each of at least two pressure-sensitive resistor pairs comprises one of the at least two first sub-pressure sensitive resistors and one of the at least two second sub-pressure sensitive resistors; in each of the pressure-sensitive resistor pairs, a point, which is farthest from the second sub-pressure sensitive resistor, on the first sub-pressure sensitive resistor is a first point, a point, which is farthest from the first sub-pressure sensitive resistor, on the second sub-pressure sensitive resistor is a second point, and a distance between the first point to the second point is less than or equal to 5 mm; each of the at least two pressure-sensitive resistor pairs is configured to detect a magnitude of pressure in a range to which each of the at least two pressure-sensitive resistor pairs responds; and the at least two pressure-sensitive resistor pairs are configured at different sensing locations according to response ranges of the at least two pressure-sensitive resistor pairs; and a pressure-sensitive signal line, which comprises a first power input line, a second power input line and a pressure-sensitive signal output line, wherein the first power input line and the second power input line are configured to input a pressure-sensitive reference signal to the pressure sensor, and the pressure-sensitive signal output line is configured to output a pressure-sensitive signal from the pressure sensor;

wherein, a first end of the first pressure-sensitive resistor is electrically connected with the first power input line, a second end of the first pressure-sensitive resistor and a first end of the second pressure-sensitive resistor are electrically connected with the pressure-sensitive signal output line, and a second end of the second pressure-sensitive resistor is electrically connected with the second power input line;

wherein, in response to determining that there are at least two pressure sensors, first power input lines corresponding to the at least two of the pressure sensors are electrically connected with each other, and second power input lines corresponding to the at least two of the pressure sensors are electrically connected with each other.

\* \* \* \* \*